United States Patent
Blaess

(10) Patent No.: US 6,545,218 B1
(45) Date of Patent: Apr. 8, 2003

(54) SAFETY COVER FOR DUAL ELECTRICAL WALL MOUNTED OUTLETS

(76) Inventor: Donald J. Blaess, 630 North St., P.O. Box 143, Ridgeway, IA (US) 52165

( * ) Notice: Subject to any disclaimer, the term of this patent is extended or adjusted under 35 U.S.C. 154(b) by 0 days.

(21) Appl. No.: 10/145,437

(22) Filed: May 14, 2002

(51) Int. Cl.[7] .............................................. H05K 5/03
(52) U.S. Cl. ............................ 174/67; 174/53; 174/66; 220/241; 439/135
(58) Field of Search .............................. 174/67, 66, 53; 220/241, 242, 3.8, 3.2; 439/135, 195, 137, 145, 136

(56) References Cited

U.S. PATENT DOCUMENTS

| | | | | |
|---|---|---|---|---|
| 2,820,842 A | * | 1/1958 | Meistrell ..................... 220/242 |
| 2,988,242 A | * | 6/1961 | Kneip ......................... 220/242 |
| 3,068,442 A | * | 12/1962 | Kubik et al. ................... 174/67 |
| 3,956,573 A | * | 5/1976 | Myers et al. ................... 174/48 |
| 4,302,624 A | * | 11/1981 | Newman ..................... 174/67 |
| 4,584,430 A | * | 4/1986 | Belknap ..................... 174/66 |
| 4,640,564 A | * | 2/1987 | Hill ............................ 439/137 |
| 4,652,696 A | | 3/1987 | Winnick |
| 4,743,206 A | * | 5/1988 | Imhoff ......................... 174/67 |
| 4,798,916 A | * | 1/1989 | Engel et al. ................... 174/67 |
| 4,952,755 A | * | 8/1990 | Engel et al. ................... 174/67 |
| 4,970,349 A | * | 11/1990 | Jones ........................... 174/67 |
| 4,993,963 A | | 2/1991 | Pedigo |
| 5,045,640 A | | 9/1991 | Riceman |
| 5,218,169 A | | 6/1993 | Riceman |
| 5,477,010 A | * | 12/1995 | Buckshaw et al. ............. 174/67 |
| 5,563,373 A | * | 10/1996 | Doroslovac ................... 174/67 |
| 5,703,329 A | | 12/1997 | Delone |
| 5,727,958 A | * | 3/1998 | Chen ........................... 174/67 |
| 5,998,735 A | * | 12/1999 | Patterson, Jr. ................ 174/67 |
| 6,217,353 B1 | * | 4/2001 | Yu-Tse ......................... 174/67 |
| 6,309,239 B1 | | 10/2001 | Johnston |
| 6,342,676 B1 | * | 1/2002 | Ha ............................... 174/67 |
| 6,372,987 B1 | * | 4/2002 | Ha ............................... 174/66 |

* cited by examiner

*Primary Examiner*—Dean A. Reichard
*Assistant Examiner*—Angel R. Estrada

(57) ABSTRACT

A safety cover for a dual electrical wall mounted outlet has a base plate with apertures that register with dual electrical wall mounted outlets. A pair of covers are pivotally located to cover the outlets. Resilient members such as elastic bands are provided to yieldingly hold the covers over the outlets. Slideable operating rods or elements are mounted for movement towards each other with one of the elements each being connected to one each of the covers so that when the separate operating elements are simultaneously moved towards each other, the covers will pivot away from the apertures to expose the outlets. The outer ends of the slideably mounted members are spaced apart sufficiently to prevent a small child from using the thumb and fingers of one hand to move the slideable members towards each other to disarm the safety cover.

9 Claims, 5 Drawing Sheets

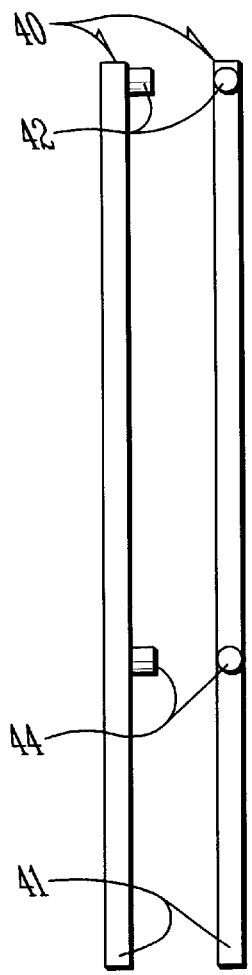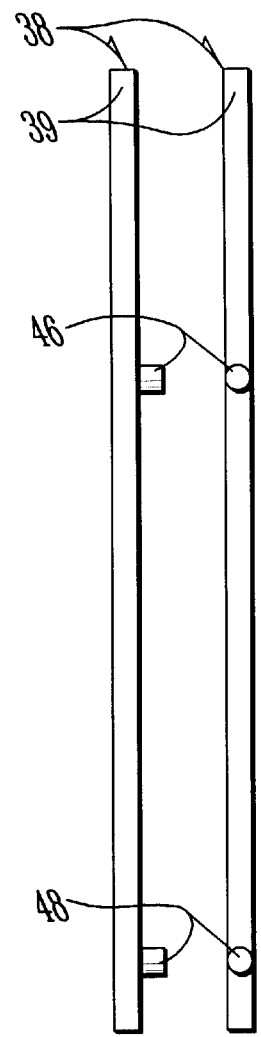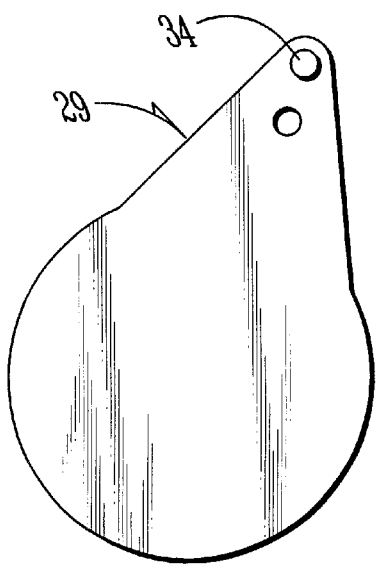

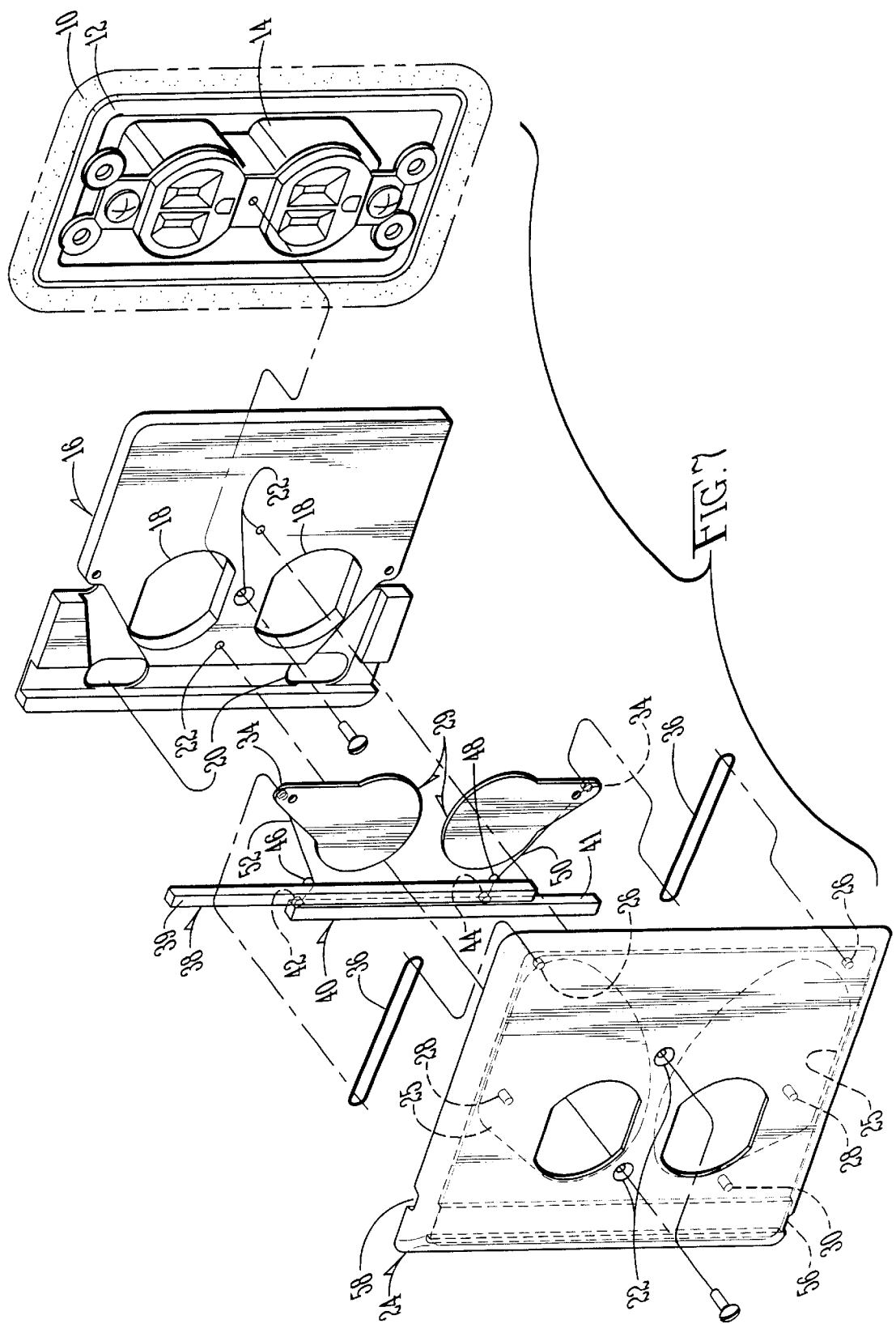

SAFETY COVER FOR DUAL ELECTRICAL WALL MOUNTED OUTLETS

BACKGROUND OF THE INVENTION

Wall mounted electrical outlets are a hazard to young children in that they may be seriously injured if a metallic object is inserted into the outlet. Some devices have been devised to diminish this risk. However, they are often complicated to make or use, and sometimes are not completely safe.

It is therefore a principal object of this invention to provide a safety cover for dual electrical wall mounted outlets that is completely safe, economical of manufacture, and easily changed to an operating condition by an adult while safely preventing access to the outlets by a young child.

These and other objects will be apparent to those skilled in the art.

SUMMARY OF THE INVENTION

A safety cover for a dual electrical wall mounted outlet has a base plate with apertures that register with dual electrical wall mounted outlets. A pair of covers are pivotally located to cover the outlets. Resilient members such as elastic bands are provided to yieldingly hold the covers over the outlets. Slidable operating rods or elements are mounted for movement towards each other with one of the elements each being connected to one each of the covers so that when the separate operating elements are simultaneously moved towards each other, the covers will pivot away from the apertures to expose the outlets. The outer ends of the slidably mounted members are spaced apart sufficiently to prevent a small child from using the thumb and fingers of one hand to move the slidable members towards each other to disarm the safety cover.

BRIEF DESCRIPTION OF THE DRAWINGS

FIG. 4 is a combined side and top view of one of the sliding elements;

FIG. 5 is a combined side and top view of another sliding element;

FIG. 6 is a plan view of a cover;

FIG. 7 is an exploded perspective view of the parts of the safety cover;

DESCRIPTION OF THE PREFERRED EMBODIMENT

Figure 1:
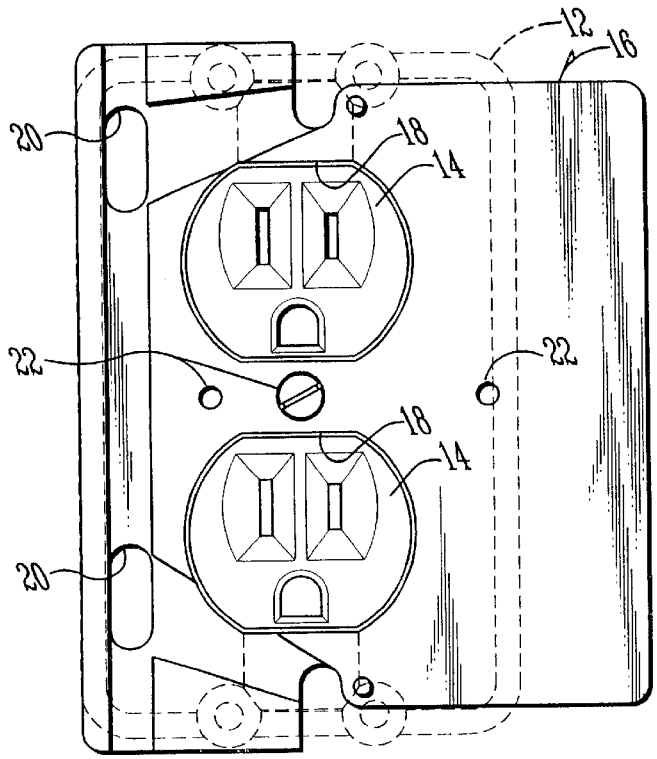
FIG. 1 is a front elevation of the base plate.

A vertical wall 10 has a conventional electrical outlet box 12 (FIG. 7) with conventional electrical outlet plugs 14. A base plate 16 (FIG. 1) has apertures 18 which are complimentary in shape and location to the outlet plugs 14. A pair of slots 20 are located in the lower portion of base plate 20 for a purpose to be described hereafter. Suitable apertures 22 are located in base plate for mounting thereof to the outlet box 12.

Figure 2:
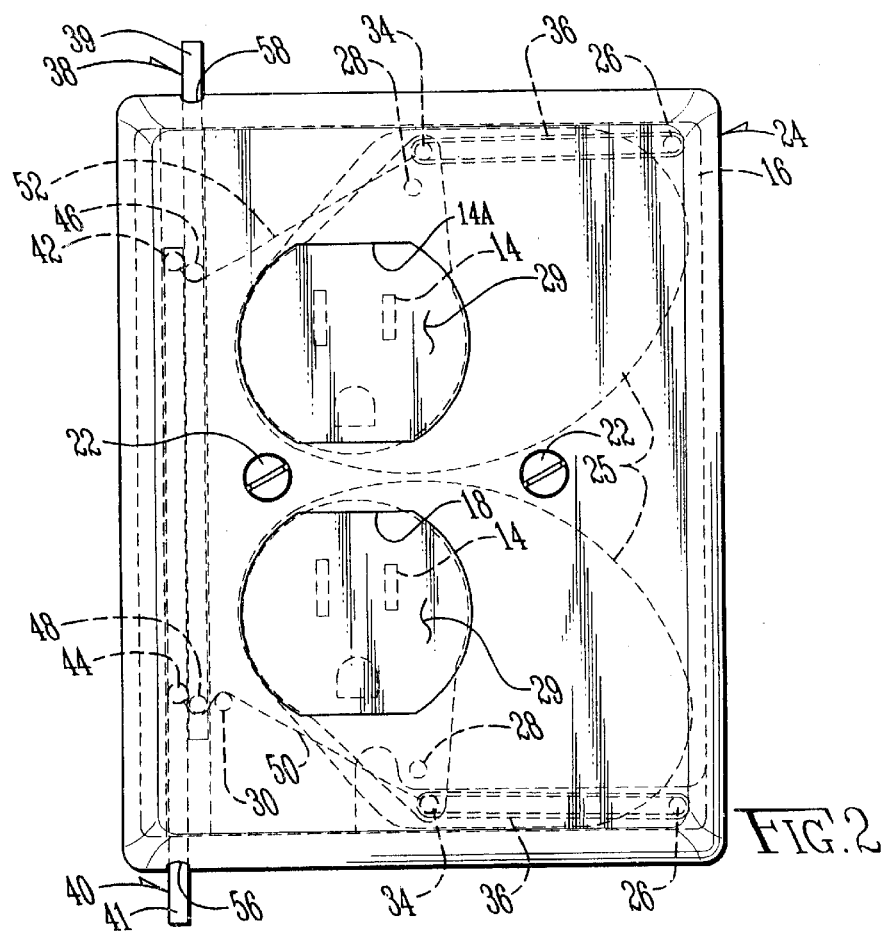
FIG. 2 is an inside elevation of the cover.

A front cover 24 (FIG. 2) has a pair of recesses 25 with a pair of spaced pins 26. A pair of pivotal pins 28 are also located in cover 24 to pivotally support covers 29 (FIGS. 8 and 9) which are adapted to pivot within the recesses 25 and are also adapted to be able to pivot over and away from the apertures 14 in base plate 16. Similar apertures 14A in front cover 24 are of the same size and are so positioned to register with the apertures 18 in base plate 16 as well as the outlet plugs 14. A guide pin 30 (FIGS. 2, 8 and 9) extends between the base plate 16 and the front cover 25 for a purpose to be described hereafter. Pins 34 extend from covers 29 to receive one end of elastic bands 36 which are looped around the pins 34 at one end and the pins 26 on the other end (FIGS. 3, 8 and 9).

Figure 3:
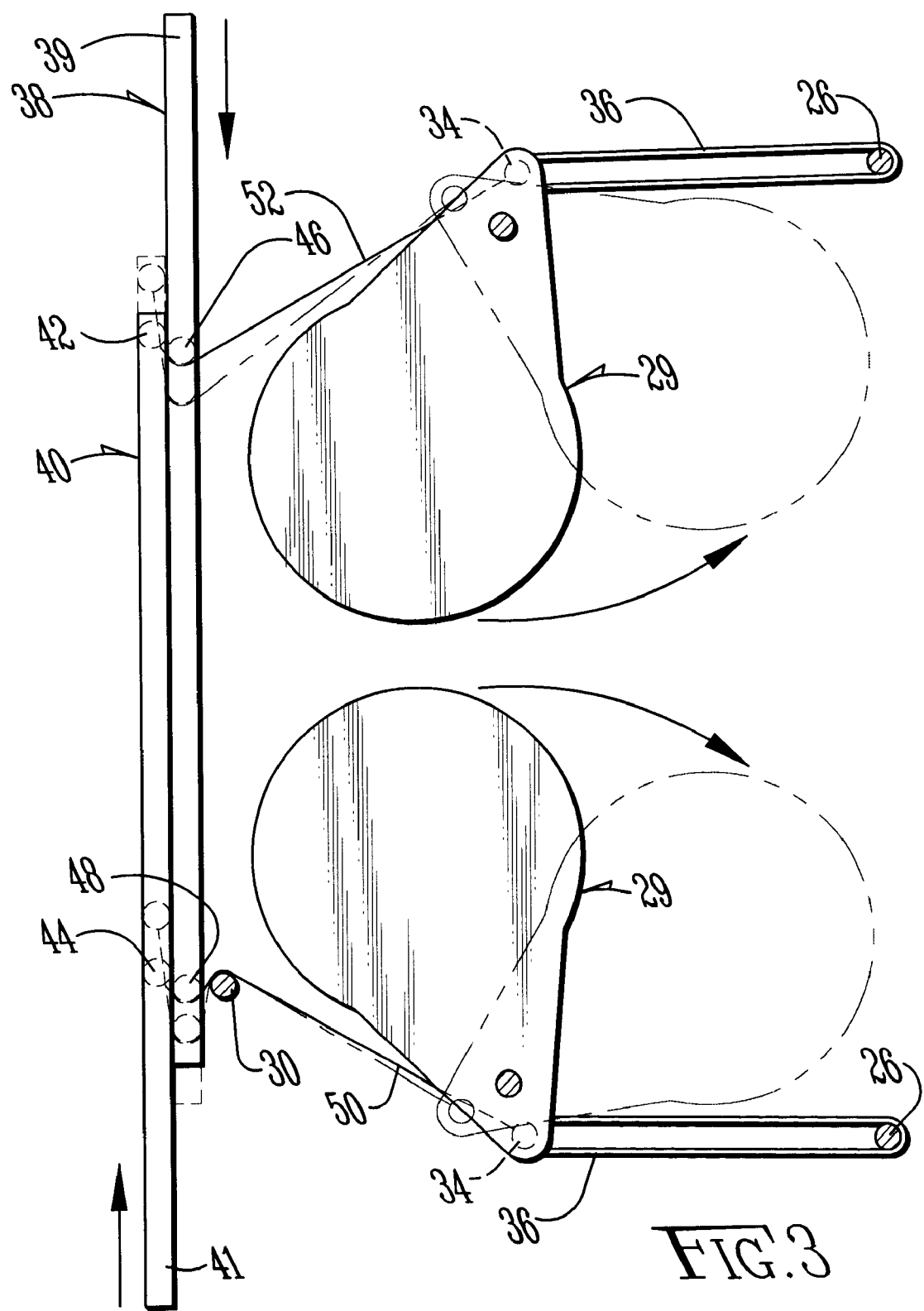
FIG. 3 is a schematic elevational view of the operating mechanism.
Figure 9:
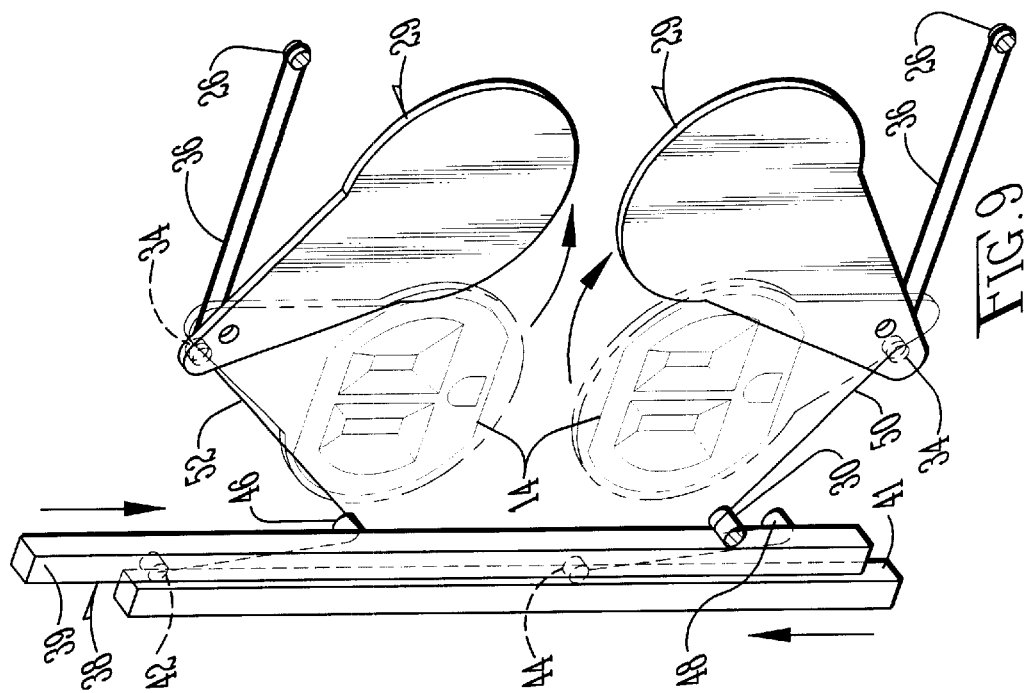
FIG. 9 is a view similar to FIG. 8 in its disarmed position.
Figure 8:
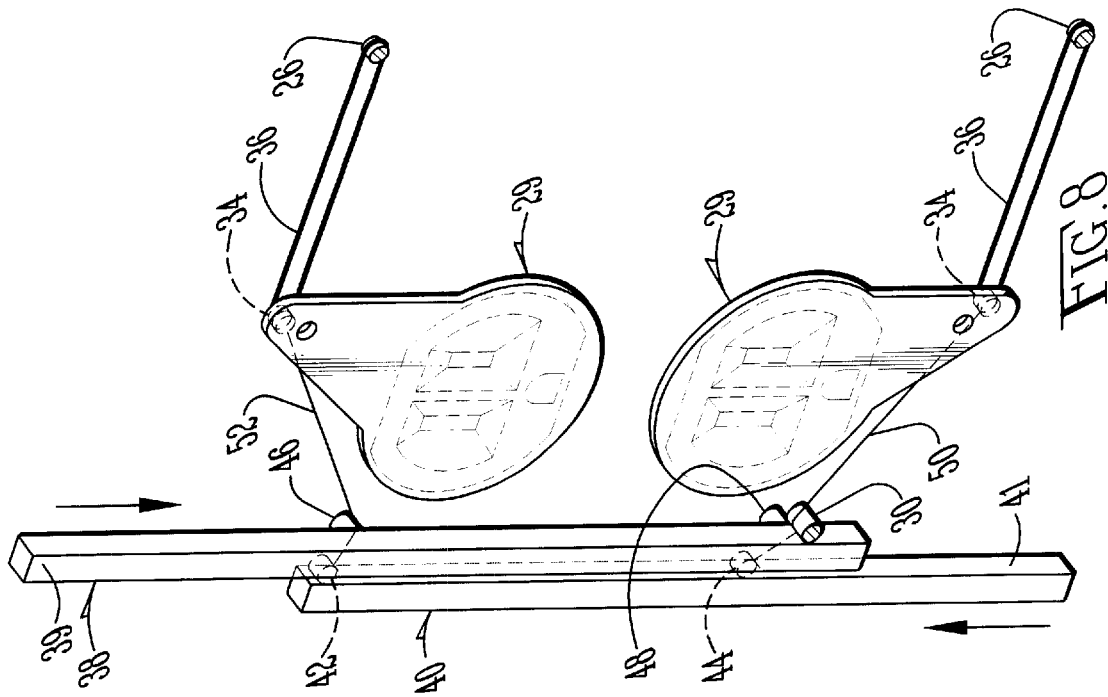
FIG. 8 is a schematic perspective view of the operating mechanism in its safety position.

A pair of operating rods or elements 38 and 40 having outward ends 39 and 41, respectively, have protrusions 42, 44, 46 and 48 extending therefrom as shown in FIGS. 3–5 and 8 and 9. As shown in FIGS. 3, 8 and 9, a flexible filament 50 has one of its ends secured to pin 34 and the other end secured to protrusion 46 on sliding element 38. Similarly, a flexible filament 52 has one of its ends secured to pin 34 on the other cover 29 and its opposite end connected to protrusion 48 on slide element 38. The filament 50 extends around the pin 30 to be in the path of protrusion 42 when sliding element 40 is moved inwardly. Similarly, the filament 52 is located in the slidable path of protrusion 44 on slidable element 40 when the element 40 is slidably moved in an inwardly direction.

It should be noted that the end 39 of sliding element 38 extends outwardly through opening 56 in front cover 24. Likewise, the outer end 41 of slide element 40 protrudes through opening 58 in the front cover 24 (see openings 56 and 58 in FIG. 2).

It should also be noted that the pins 34 on covers 29 are offset from the pivot pins 28 which pivotally support each of the covers so that tension on pins 34 will cause the covers to rotate about pins 28. Normally, the bands 36 exerting tension on pins 34 hold the covers in the closed position shown in FIGS. 3 and 8.

However, when manual pressure is exerted in an inward direction on the ends 39 and 41 of slidable rods 38 and 40, respectively, tension is exerted on the otherwise slacked condition of filaments 50 and 52. As best shown in FIG. 9, when tension is thereupon exerted on filaments 50 and 52, the covers 29 are pivoted from the closed position of FIGS. 3 and 8 to the operating or open condition of FIG. 9. The tension in filament 50 is effected by the intersection of filament 50 by protrusion 42 between the pins 30 and 46 (see FIGS. 3, 8 and 9) as the two sliding members 38 and 40 are pushed inwardly with respect to the openings 56 and 58, respectively. Similarly, tension is exerted on filament 52 during the inwardly sliding action of elements 38 and 40 by the intersection of protrusion 44 with filament 52 as shown in FIG. 9. These protrusions extend into slots 20 of base plate 16 (FIG. 1) and are guided by the slots during sliding action of elements 38 and 40.

Thus, the bands 36 normally hold the covers 29 in their closed positions as shown in FIGS. 3 and 8, wherein both of the filaments 50 and 52 are in their slacked positions. When an adult wishes to utilize one or both of the outlet plugs 14, the ends 39 and 41 of elements 38 and 40 are pushed inwardly through the openings 56 and 58, as described heretofore, this is normally effected by exerting inward pressure on the ends 39 and 41 between the thumb and index finger of the adult. Thus, as the covers 29 pivot from the position of FIGS. 3 and 8 to the position of FIG. 9, the outlet plugs 14 are exposed and can be used. When the plugs are in use, the covers 29 are held in the position of FIG. 9 by the male plugs inserted into the outlet plugs 14. When the male plugs are removed, the bands 36 pivot the covers 29 to their closed positions from the position shown in FIG. 9 to the position shown in 3 and 8.

The beneficial result of the foregoing structure is that a small child cannot with one hand simultaneously push the ends 39 and 41 of the slidable elements 38 and 40 towards each other between his or her thumb and index fingers. As a result, the foregoing structure is easily operated by an adult with larger hands, but is essentially inoperative, and hence safe, by a child with smaller hands.

As is apparent, the covers 29 need to be pivoted within the planar confines of recesses 25. It should be noted that whether the covers 29 and the pins associated with bands 36 are mounted on the base or the cover is unimportant. The important thing is that these related components are located between the inside surface of the cover 24 (FIG. 2) and the outside surface of the base plate 16.

It is therefore seen that this invention will achieve at least all of its stated objectives.

I claim:

1. A safety cover for dual electrical wall mounted outlets, comprising, a base plate having apertures for registering with dual electrical wall mounted outlets, a pair of covers pivotally mounted on the base plate and covering the outlets;

resilient means connecting the covers and the plate to yieldingly hold the covers over the outlets, separate operating elements connected to the base plate for movement towards each other with each of the elements each being connected to one of the covers so that when the separate operating elements are simultaneously moved towards each other, the covers will pivot away from the apertures to expose outlets aligned with the apertures, and wherein the operating elements are elongated slidably mounted members having outer ends extending between and beyond opposite sides of the base plate.

2. The device of claim 1 wherein a cover plate having apertures that register with the apertures in the base plate extends over the base plate and is attachable thereto.

3. The device of claim 2 wherein a pair of elongated slots are in the cover to receive and longitudinally guide longitudinal movement of the operating elements.

4. A safety cover for dual electrical wall mounted outlets, comprising, a base plate having apertures for registering with dual electrical wall mounted outlets, a pair of covers pivotally mounted on the base plate and covering the outlets;

resilient means connecting the covers and the plate to yieldingly hold the covers over the outlets, separate operating elements connected to the base plate for movement towards each other with each of the elements each being connected to one of the covers so that when the separate operating elements are simultaneously moved towards each other, the covers will pivot away from the apertures to expose outlets aligned with the apertures, wherein the operating elements are elongated slidably mounted members having outer ends extending between and beyond opposite sides of the base plate; flexible filaments each connected by one end to one of the covers and extending to connection with one of the slidably mounted members, and being connected to the respective covers at a location offset from the pivotal mounting of the covers to the base plate so that tension on the filaments in a direction away from the covers will cause the covers to pivot on the base plate in a direction away from the apertures, the other ends of the filaments being connected to one of the slidably mounted members so that when the members are simultaneously moved towards each other, the members will pull on the filament to pivot the covers away from the apertures.

5. The device of claim 4 wherein the filaments are normally in a slacked condition, but move to a taut condition when the slidably mounted members are simultaneously moved towards each other.

6. The device of claim 5 wherein the other ends of the filaments are each fixedly secured to one of the slideable members, and wherein the other ends move in a longitudinal direction towards each other when the slideably mounted members are moved towards each other, whereby the filaments secured to each slideable member impinges on protrusions on the other slideable member, whereby the filaments are drawn to a taut condition.

7. The device of claim 6 wherein the protrusions on the slideable members move in a longitudinal direction towards each other to accelerate tensioning of the filaments to the taut condition.

8. The device of claim 6 wherein the protrusions and the other ends of the filaments are located such that longitudinal movement of only one of the slideable mounted members will be insufficient to fully remove the slack from the filaments so as to exert sufficient tension thereon to pivot the covers from the apertures.

9. The device of claim 4 wherein the outer ends of the slideably mounted members are in excess of three inches apart to prevent a young child from simultaneously engaging the outer ends between the child's thumb and any one of the child's fingers on one hand.

* * * * *